(12) United States Patent
Iwasawa et al.

(10) Patent No.: US 8,836,348 B2
(45) Date of Patent: Sep. 16, 2014

(54) ELECTROSTATIC CAPACITANCE TYPE PHYSICAL QUANTITY SENSOR AND ANGULAR VELOCITY SENSOR

(75) Inventors: Hiroshi Iwasawa, Hitachi (JP); Masahiro Matsumoto, Hitachi (JP); Toshiaki Nakamura, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 264 days.

(21) Appl. No.: 13/382,395

(22) PCT Filed: Jul. 15, 2010

(86) PCT No.: PCT/JP2010/062012
§ 371 (c)(1),
(2), (4) Date: Jan. 5, 2012

(87) PCT Pub. No.: WO2011/024576
PCT Pub. Date: Mar. 3, 2011

(65) Prior Publication Data
US 2012/0105080 A1  May 3, 2012

(30) Foreign Application Priority Data

Aug. 31, 2009 (JP) ................................ 2009-200508

(51) Int. Cl.
*G01R 27/26* (2006.01)
*G01P 15/125* (2006.01)
*G01P 15/08* (2006.01)
*G01D 5/24* (2006.01)
*G01D 3/028* (2006.01)
*G01C 19/5726* (2012.01)

(52) U.S. Cl.
CPC ........... *G01P 15/125* (2013.01); *G01P 15/0802* (2013.01); *G01D 5/24* (2013.01); *G01D 3/028* (2013.01); *G01C 19/5726* (2013.01)

USPC ........... 324/679; 324/690; 324/662; 324/452; 324/457; 324/112; 73/862.626; 73/862.68; 73/517 B; 73/1 D (58) Field of Classification Search
USPC ......... 324/679, 662, 452, 457, 112, 687, 690; 73/862.626, 862.68, 517 B, 1 D
See application file for complete search history.

(56) References Cited

U.S. PATENT DOCUMENTS 5,095,750 A * 3/1992 Suzuki et al. .............. 73/514.19
5,464,997 A * 11/1995 Watanabe .................... 257/239
(Continued)

FOREIGN PATENT DOCUMENTS

JP   63-212873 A   9/1988
JP    3-6461 A    1/1991
(Continued)

OTHER PUBLICATIONS

Extended European Search Report Dated Jul. 12, 2013 {Five (5) Pages}.

(Continued)

*Primary Examiner* — Huy Q Phan
*Assistant Examiner* — Temilade S Rhodes-Vivour
(74) *Attorney, Agent, or Firm* — Crowell & Moring LLP (57) ABSTRACT

The present invention provides a high-accuracy electrostatic capacitance type physical quantity sensor and angular velocity sensor configured so as to be capable of suppressing noise derived from internal noise while maintaining resistance to externally-incoming noise. A detection element 10 has a movable mass 18 supported displaceably by a physical quantity given from the outside, and a detection electrode Ef. A shield wire 16 is disposed around wirings connected to the input of a capacitance detection circuit 30 and is connected to a dc potential of low impedance. A value Cin of an input capacitance relative to a fixed potential of low impedance at a portion at which the detection element 10 is connected with the capacitance detection circuit 30 is set to fall within a range of 1.5 pF<Cin<20 pF.

6 Claims, 6 Drawing Sheets

(56) References Cited

U.S. PATENT DOCUMENTS

| | | | |
|---|---|---|---|
| 5,492,020 A * | 2/1996 | Okada | 73/862.626 |
| 5,908,986 A * | 6/1999 | Mitamura | 73/504.12 |
| 6,101,866 A * | 8/2000 | Shiozaki et al. | 73/37.5 |
| 6,331,780 B1 * | 12/2001 | Hiroshima et al. | 324/684 |
| 6,681,630 B1 | 1/2004 | Kumada et al. | |
| 2008/0110260 A1 * | 5/2008 | Konno et al. | 73/514.32 |

FOREIGN PATENT DOCUMENTS

| | | |
|---|---|---|
| JP | 7-306222 A | 11/1995 |
| JP | 2000-515253 A | 11/2000 |
| JP | 2001-91261 A | 4/2001 |
| JP | 2007-51930 A | 3/2007 |
| JP | 2008-82850 A | 4/2008 |

OTHER PUBLICATIONS

Reverter, Ferran et al. "A novel interface circuit for grounded capacitive sensors with feedforward-based active shielding," *Measurement Science and Technology* vol. 19, Jan. 14, 2008 {Five (5) Pages}.

English Translation of International Preliminary Report on Patentability (Forms PCT/IB/338, PCT/IB/373, and PCT/ISA/237) dated Mar. 22, 2012 (six (6) pages).

Corresponding International Search Report with English Translation dated Sep. 28, 2010 (five (5) pages).

Form PCT/ISA/237 (three (3) pages).

\* cited by examiner

ELECTROSTATIC CAPACITANCE TYPE PHYSICAL QUANTITY SENSOR AND ANGULAR VELOCITY SENSOR

TECHNICAL FIELD

The present invention relates to an electrostatic capacitance type physical quantity sensor and an angular velocity sensor, and particularly to an electrostatic capacitance type physical quantity sensor and an angular velocity sensor suitable for a reduction in noise.

BACKGROUND ART

Known various physical quantity sensors convert an amount of mechanical displacement corresponding to a physical quantity from the outside into an electric signal to thereby detect a physical quantity. For example, an acceleration sensor takes out, as an electric signal, a change in electrostatic capacitance between a movable electrode displaced according to acceleration and a fixed detection electrode in a detection element and thereby detects acceleration. (refer to, for example, Patent Document 1; JP-7-306222-A)

Although each of these physical quantity sensors converts the change in the electrostatic capacitance of the detection element into the electric signal using the capacitance detection circuit, a portion (hereinafter called a capacitance detection input section) at which the detection element is connected with the capacitance detection circuit is brought to electrically high impedance. For this reason, the physical quantity sensor is weak to electromagnetic or electrostatic externally-incoming noise. Therefore, as described in the Patent Document 1, a grounded conductive member covers the detection element to serve as an electromagnetic shield, thereby achieving a reduction in the externally-incoming noise.

PRIOR ART LITERATURE

Patent Document

Patent Document 1: JP-7-306222-A

SUMMARY OF THE INVENTION

Problem to be Solved by the Invention

The electromagnetic shield described in the Patent Document 1 becomes resistant to externally-incoming noise as it is made closer to the capacitance detection input section and is made on a larger scale. However, it has a drawback that noise derived from internal noise will increase.

An object of the present invention is to provide a high-accuracy electrostatic capacitance type physical quantity sensor and angular velocity sensor both configured so as to be capable of suppressing noise derived from internal noise while maintaining resistance to externally-incoming noise.

Means for Solving the Problem (1) In order to achieve the above object, the present invention provides an electrostatic capacitance type physical quantity sensor comprising a detection element having a movable mass supported displaceably by a physical quantity given from the outside, and a detection electrode formed in at least one side of the movable mass; a capacitance detection circuit which detects a change in the capacitance of the detection electrode due to the displacement of the movable mass; and wirings which are disposed around wirings connected to an input of the capacitance detection circuit, the former wire being connected to a dc potential of low impedance, wherein the capacitance detection circuit converts the change in the capacitance of the detection electrode due to the displacement of the movable mass into an electric signal to thereby detect a physical quantity, and wherein a value Cin of an input capacitance relative to a fixed potential of low impedance at a portion at which the detection element is connected with the capacitance detection circuit falls within a range of 1.5 pF<Cin<20 pF.

With such a configuration, noise derived from internal noise can be suppressed while resistance to externally-incoming noise is being maintained, whereby a high-accuracy electrostatic capacitance type physical quantity sensor can be provided.

(2) In the above (1), preferably, an electrostatic capacitance type physical quantity sensor is provided wherein a relationship between a value Cf of a feedback capacitor in the capacitance detection circuit and the input Cin falls within a range of 0.1<(Cf/Cin)<1.0.

(3) In the above (1), preferably, an electrostatic capacitance type physical quantity sensor is provided wherein the shield wire has the same potential as a dc potential of a carrier wave signal used in capacitance detection.

(4) In the above (1), preferably, an electrostatic capacitance type physical quantity sensor is provided wherein the detection element is provided with diagnostic electrodes each of which applies an electrostatic attraction force to the movable mass.

(5) In the above (1), preferably, an electrostatic capacitance type physical quantity sensor is provided wherein the movable mass comprises silicon crystal.

(6) In order to achieve the above object, the present invention provides an angular velocity sensor comprising a detection element including a movable mass supported displaceably by an angular velocity given from the outside, two detection electrodes formed in two surfaces orthogonal to each other, of the movable mass, and drive electrodes which vibrate the movable mass; a capacitance detection circuit which detects changes in capacitances of the two detection electrodes by a Coriolis effect derived from an angular velocity applied to the movable mass in a state of vibration, the state of vibration being caused by the drive electrodes; and wirings which are disposed around wirings connected to an input of the capacitance detection circuit, the former wire being connected to a dc potential of low impedance, wherein the capacitance detection circuit converts the change in the capacitance of each of the detection electrodes due to the displacement of the movable mass into an electric signal to thereby detect an angular velocity, and wherein a value Cin of an input capacitance relative to a fixed potential of low impedance at a portion at which the detection element is connected with the capacitance detection circuit falls within a range of 1.5 pF<Cin<20 pF.

With such a configuration, noise derived from internal noise can be suppressed while resistance to externally-incoming noise is being maintained, whereby a high-accuracy angular velocity sensor can be provided.

Effects of the Invention

According to the present invention, noise derived from internal noise can be suppressed while resistance to externally-incoming noise is being maintained, whereby a high-accuracy angular velocity sensor and angular velocity sensor can be provided.

MODE FOR CARRYING OUT THE INVENTION

A configuration and an operation of an electrostatic capacitance type physical quantity sensor according to one embodiment of the present invention will hereinafter be described using FIGS. 1 through 3.

The configuration of the electrostatic capacitance type physical quantity sensor according to the present embodiment will first be explained using FIG. 1.

Figure 1:
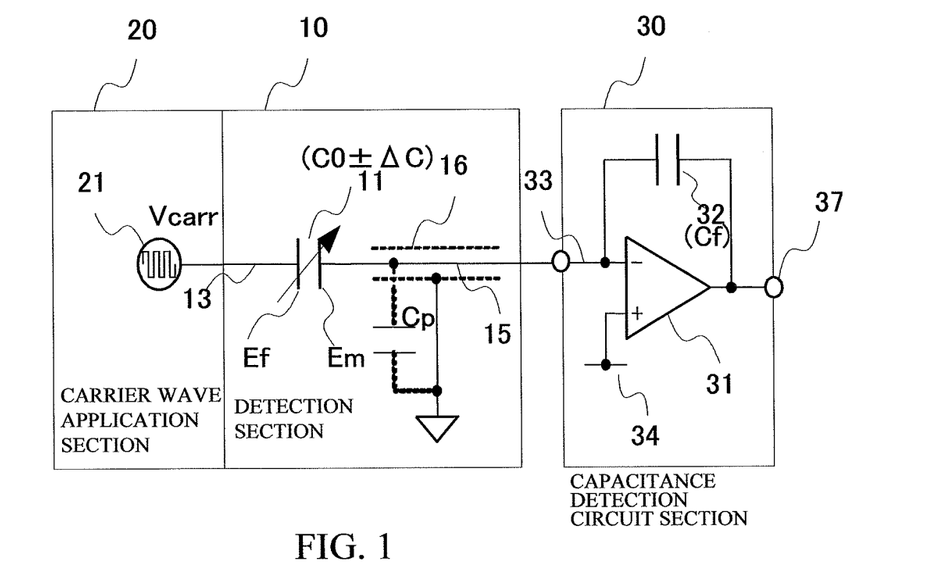
FIG. 1 is a circuit diagram showing a configuration of an electrostatic capacitance type physical quantity sensor according to one embodiment of the present invention.

FIG. 1 is a circuit diagram showing the configuration of the electrostatic capacitance type physical quantity sensor according to the one embodiment of the present invention.

The electrostatic capacitance type physical quantity sensor according to the present embodiment is comprised of a detection element 10, a carrier wave application section 20 and a capacitance detection circuit section 30.

The detection element 10 is provided with a variable-capacitance capacitor 11. The variable-capacitance capacitor 11 consists of a detection electrode Ef which is not displaced even if a physical quantity such as acceleration, an angular velocity, pressure, or the like is applied thereto, and a movable electrode Em displaced with the application of the physical quantity to the detection element 10. The movable electrode Em and the detection electrode Ef are disposed parallel to each other, and a capacitance C is formed therebetween.

Assuming that the capacitance of the variable-capacitance capacitor 11 where no physical quantity is applied, is C0 and a change in the capacitance at the time that the physical quantity is applied is $\Delta c$, the capacitance of the variable-capacitance capacitor 11 becomes $C0 \pm \Delta C$.

A detection electrode side wire 13 is connected to the detection electrode Ef. A movable electrode side wire 15 is connected to the movable electrode Em. A shield wire 16 is disposed around the movable electrode side wire 15. The shield wire 16 is connected to a dc potential of low impedance. The shield wire 16 is connected to a potential of low impedance having the same dc potential as the movable electrode Em. Equalizing the dc potentials of both the shield wire 16 and a movable mass holding the movable electrode to each other in this way makes it possible to prevent an unnecessary electrostatic attraction force from acting on the movable mass due to the difference in potential. Incidentally, a ground potential is contained in the dc potential of low impedance. Here, a parasitic capacitor Cp is formed between the movable electrode side wire 15 and the shield wire 16. The parasitic capacitor Cp is 8.0 pF, for example.

The carrier wave application section 20 is provided with a carrier wave signal source 21. A carrier wage signal Vcarr outputted from the carrier wave signal source 21 is applied to the detection electrode Ef through the detection electrode side wire 13 of the detection element 10. The carrier wave signal Vcarr is transferred to the movable electrode side wire 15 through the variable-capacitance capacitor 11. When the capacitance of the variable-capacitance capacitor 11 changes at this time, the carrier wave signal itself also changes.

The capacitance detection circuit section 30 amplifies the carrier wave signal outputted from the movable electrode side wire 15. The capacitance detection circuit section is made up of an OP amplifier 31, a feedback capacitor 32, an input terminal 33 and an output terminal 37. The carrier wave signal Vcarr transferred via the variable-capacitance capacitor 11 is inputted to the input terminal 33. The input terminal 33 is connected to an inversion input of the OP amplifier 31. The feedback capacitor 32 is coupled between the output terminal 37 of the OP amplifier 31 and the input terminal 33. A non-inversion input of the OP amplifier 31 is connected to a reference potential 34. Incidentally, since the earth capacitance of the input terminal 33 also acts in the same manner as the capacitance between the movable electrode side wire 15 and the shield wire 16 in the detection element, it is contained in the parasitic capacitance Cp.

A description will be made of noise in the electrostatic capacitance type physical quantity sensor according to the present embodiment. Here, the noise includes three types: 1) noise derived from the outside, 2) noise derived from the inside, and 3) noise derived from the structure.

A noise source is provided outside the electrostatic capacitance type physical quantity sensor. Although noise from the noise source is shielded by the electromagnetic shield 16, it is superimposed on the movable electrode side wire 15 as the noise derived from the outside if a shielding effect is not enough. The noise derived from the outside is amplified by the capacitance detection circuit section 30 and superimposed on the carrier wave signal, followed by being detected from the output terminal 37.

An internal noise source is provided inside the capacitance detection circuit section 30. Internal noise is noise synchronized with the carrier wave signal Vcarr and contained in the reference potential 34. The noise derived from the inside is amplified by the capacitance detection circuit section 30 and superimposed on the carrier wave signal, followed by being detected from the output terminal 37.

Further, when the detection electrode Ef and the movable electrode Em that constitute the variable-capacitance capacitor 11 change in a state in which they are held in a state of equilibrium each other, a change in capacitance corresponding to the applied physical quantity appears. When, however, the size of the electrode becomes large, for example, the movable electrode Em flexes and changes when the movable electrode Em changes due to the physical quantity. In this case, a change in the capacitance of the variable-capacitance capacitor 11 may not correspond to the applied physical quantity. This is called the noise derived from the structure. It is detected as a change in the carrier wave signal at the output terminal due to the noise derived from the structure.

A description will next be made of noise in the electrostatic capacitance type physical quantity sensor according to the present embodiment using FIG. 2.

Figure 2:
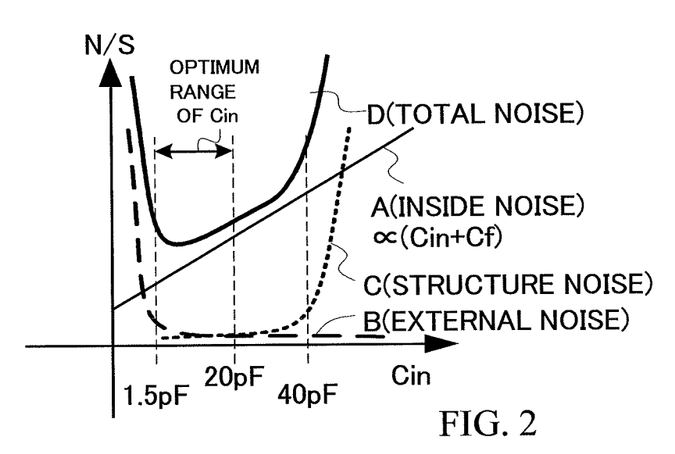
FIG. 2 is a diagram for describing noise in the electrostatic capacitance type physical quantity sensor according to the one embodiment of the present invention.

FIG. 2 is a diagram for describing the noise in the electrostatic capacitance type physical quantity sensor according to the one embodiment of the present invention.

A description will be made here of the relationship between a value Cin of an earth capacitance of wirings connected to the input terminal 33 of the capacitance detection circuit section 30 and noise. Here, the input capacitance Cin of the capacitance detection circuit section 30 corresponds to a total value of the capacitance C0 of the variable-capacitance capacitor 11 and the parasitic capacitance Cp.

In FIG. 2, the horizontal axis indicates the input capacitance Cin. The vertical axis indicates noise (N/S).

Assuming that a predetermined physical quantity is applied and a change in capacitance is $\Delta C$, the capacitance of the variable-capacitance capacitor 11 becomes $C0+\Delta C$. When the carrier wave signal is applied to the detection electrode Ef, a charge signal that appears at the movable electrode Em is proportional to the change in capacitance $\Delta C$. The charge signal that has appeared at the movable electrode Em is inputted to the input terminal 33 of the capacitance detection circuit section 30 and converted into a voltage signal.

A feedback amplifier circuit using an OP amplifier is configured at the capacitance detection circuit section 30. With the configuration of a negative feedback circuit by the feedback capacitor 32, the OP amplifier 31 outputs a signal in such a manner that the voltage of the input terminal 33 becomes equal to the voltage of the reference potential 34.

As a result, the charge signal inputted to the input terminal 33 is converted as a voltage signal at the output terminal 37. When the voltage amplitude of the carrier wave signal is Vcarr, the amplitude VoutS of the signal voltage that appears at the output terminal 37 becomes $VoutS = Vcarr \cdot \Delta C / Cf$ due to the amount of change $\Delta C$ in the capacitance of the detection electrode.

The signal voltage amplitude VoutS is proportional to the change in the capacitance $\Delta C$. Since this is proportional to a displacement of the movable mass by the physical quantity, the physical quantity can be detected by measuring the signal voltage amplitude VoutS.

Now when the earth capacitance that exists in a portion at which the detection element 10 is connected with the capacitance detection circuit section 30 is large and a noise component contained in the reference potential 34 is large, internal noise derived from these becomes large.

The noise derived from the inside will first be explained. A solid line A of FIG. 2 indicates the noise derived from the inside.

When circuit internal noise synchronized with the carrier wave signal is contained in the reference potential 34 of the capacitance detection circuit section, the noise is amplified through the earth capacitance Cin of the input part of the capacitance detection circuit section 30 and the feedback capacitor Cf of the capacitance detection circuit section and appears at the output thereof. When the voltage of the circuit internal noise is Vnb and the total of the value of the earth capacitance at the capacitance detection input part is Cin (=value C0 of detection electrode capacitance+value Cp of parasitic capacitance 17), a noise voltage VoutN that is derived from the circuit internal noise and appears at the output of the capacitance detection circuit section is expressed in $VoutN = Vnb \cdot (Cin+Cf)/Cf$.

That is, the noise derived from the inside is proportional to (Cin+Cf) as indicated by the solid line A of FIG. 2. When the input capacitance Cin increases, the noise increases linearly. As a result, the input capacitance Cin may preferably be rendered small to reduce noise arising from the noise derived from the inside. Incidentally, the feedback capacitor 32 having a constant value ranging from about 0.2 pF to about 2.0 pF, for example, is used for the feedback capacitor Cf. When the feedback capacitor Cf is large in capacitance, the sold line indicated in FIG. 2 is generally shifted in the direction in which noise increases. When the feedback capacitor Cf is small in capacitance, the solid line A indicated in FIG. 2 is generally shifted in the direction in which noise decreases.

The noise derived from the outside will next be described. Providing the electromagnetic shield 16 around the movable electrode side wire 15 is effective at suppressing the externally-incoming noise. However, the parasitic capacitance Cp increases when the electromagnetic shielding is done, so that the input capacitance Cin also increases.

A broken line B of FIG. 2 indicates a change in the noise derived from the outside with respect to the input capacitance Cin. That is, the provision of the electromagnetic shield suddenly reduces the noise derived from the outside according to the degree of its shielding. When, however, it exceeds a certain input capacitance Cin, the degree of a reduction in the noise derived from the outside becomes gentle. It turned out that as a result of examination of the degree of the reduction in the noise derived from the outside, a curve indicated by the broke line B in FIG. 2 has an inflection point at an input capacitance Cin of 1.5 pF, and the degree of the reduction in the noise derived from the outside becomes gentle when greater than 1.5 pF.

Since the noise derived from the inside is proportional to the input capacitance, the effect of the noise derived from the inside can be reduced where the input capacitance Cin is small. On the other hand, when the input capacitance is rendered small, i.e., when the degree of the electromagnetic shielding is rendered gentle, the noise derived from the outside increases. Thus, the input capacitance Cin may preferably be set to 1.5 pF or more from the above viewpoints.

The noise derived from the structure will next be explained. A dotted line C of FIG. 2 shows the manner in which the noise derived from the structure changes relative to the input capacitance Cin.

When the size of the movable electrode is increased, the capacitance C0 of the variable-capacitance capacitor 11 increases. As a result, the input capacitance Cin also increases. When the scale of the detection electrode is made excessively large while holding a fine structure of the detection element, manufacturing fluctuations in structure become innegligible and noise suddenly increases. This is called the noise derived from the structure.

When the size of the movable electrode is rendered large and the input capacitance Cin becomes large, the noise derived from the structure gradually increases as indicated by the dotted line C in FIG. 2. There is shown a characteristic that the degree of the increase in the noise is gentle till a certain input capacitance Cin, but suddenly increases subsequently. Such a suddenly-changed point is called an inflection point and the input capacitance Cin at this time is 40 pF. Thus, the input capacitance Cin is preferably set to 40 pF or less in terms of the noise derived from the structure. As described above, however, the noise derived from the inside has the property of increasing when the input capacitance Cin increases.

In FIG. 2, a thick solid line D shows total noise obtained by adding the noise derived from the inside (solid line A), the noise derived from the outside (broken line B) and the noise derived from the structure (dotted line C). Here, the total noise at the time that the input capacitance Cin is 40 pF becomes drastically larger than total noise at the time the input capacitance Cin is 1.5 pF, under the effect of the noise derived from the inside.

Here, total noise at a point (where the input capacitance Cin is 20 pF) at which the characteristic curves of the noise derived from the outside (broken line B) and the noise derived from the structure (dotted line C) intersect, is significantly smaller than the total noise where the input capacitance Cin is 40 pF, and is the same noise level as the total noise where the input capacitance Cin is 1.5 pF.

Judging from the above result of examination, the optimum range of the input capacitance value Cin becomes 1.5 pF<Cin<20 pF.

The sizes of the detection electrode and the movable electrode and the interval therebetween are set in such a manner that when the stray capacitance Cp is 8.0 pF, for example, the capacitance Co of the variable-capacitance capacitor 11 reaches 2.2 pF. Consequently, the input capacitance Cin can be set to 10.2 pF and brought within the above optimum range.

The noise in the electrostatic capacitance type physical quantity sensor according to the present embodiment will next be explained from another viewpoint using FIG. 3.

Figure 3:
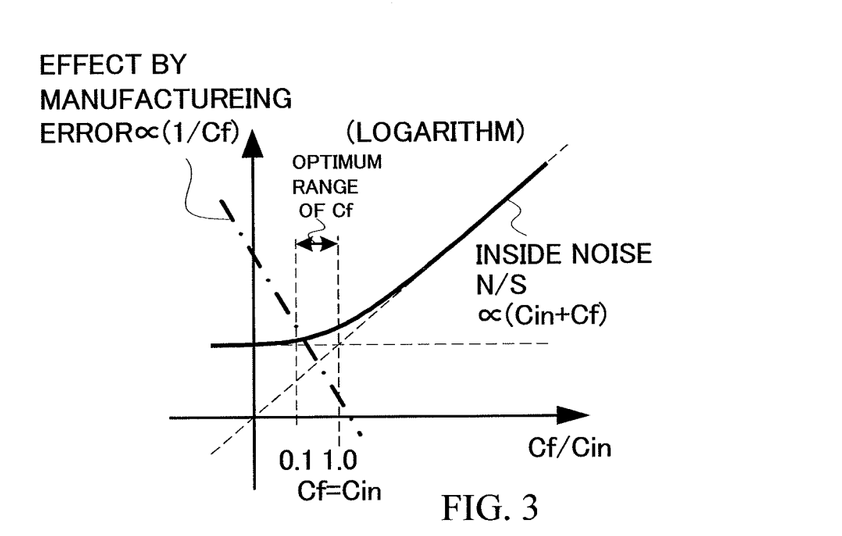
FIG. 3 is a diagram, as viewed from another viewpoint, for describing noise in the electrostatic capacitance type physical quantity sensor according to the one embodiment of the present invention.

FIG. 3 is a diagram, as viewed from another viewpoint, for describing the noise in the electrostatic capacitance type physical quantity sensor according to the one embodiment of the present invention.

The electrostatic capacitance type physical quantity sensor according to the present embodiment can obtain a more satisfactory characteristic in that the relationship between the value Cf of the feedback capacitor 32 in the capacitance detection circuit section and the input capacitance Cin falls within a range of 0.1<(Cf/Cin)<1.0.

The value of (Cf/Cin) is first set to 0.1 or more, so that the effect (one-dot chain line in the drawing) by a manufacturing error of the feedback capacitor 32 can be reduced as shown in FIG. 3.

Next, the value of (Cf/Cin) is set to 1.0 or less. As a result, the effect (broken line in the drawing) by the internal noise can be reduced. This is because the effect by the internal noise is affected even by the value of Cf as well as the value of Cin.

For this reason, a reduction in error due to variations in the manufacture of the feedback capacitor 32 and a reduction in the effect of noise derived from the internal noise can be made compatible.

According to the present embodiment as described above, the reduction in the effect by the externally-incoming noise and the reduction in the effect of noise derived from the internal noise can be made compatible, and high-accuracy detection of the physical quantity is enabled.

A configuration and an operation where the electrostatic capacitance type physical quantity sensor according to the one embodiment of the present invention is applied to an acceleration sensor, will next be explained using FIGS. 4 and 5.

Figure 4:
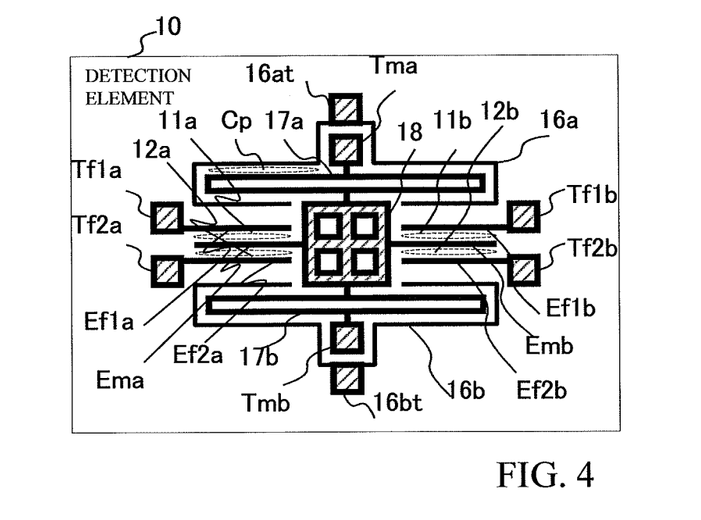
FIG. 4 is a plan view illustrating a configuration of a detection element where the electrostatic capacitance type physical quantity sensor according to the one embodiment of the present invention is applied to an acceleration sensor.
Figure 5:
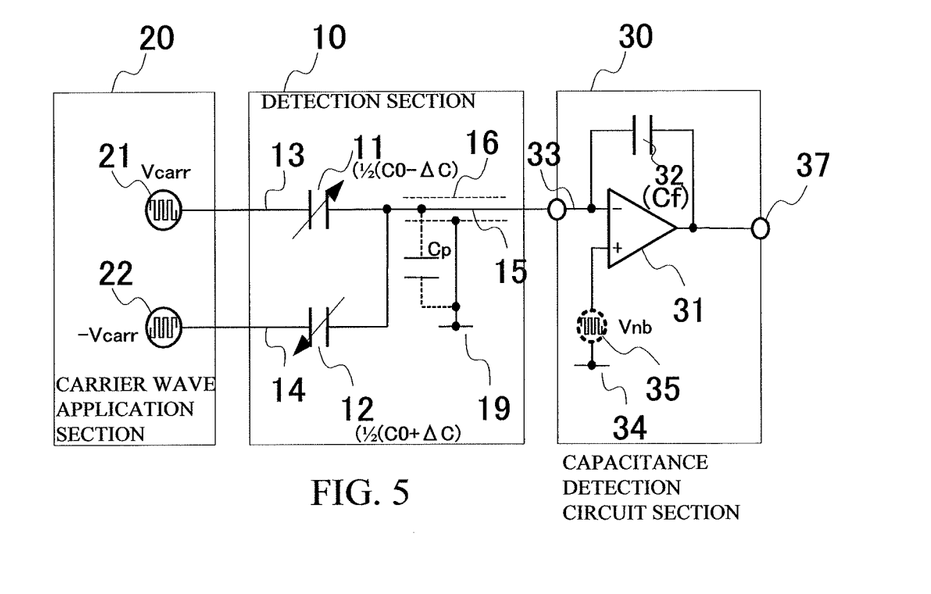
FIG. 5 is a circuit diagram showing a configuration where the electrostatic capacitance type physical quantity sensor according to the one embodiment of the present invention is applied to the acceleration sensor.

FIG. 4 is a plan view illustrating a configuration of a detection element where the electrostatic capacitance type physical quantity sensor according to the one embodiment of the present invention is applied to the acceleration sensor. FIG. 5 is a circuit diagram showing a configuration where the electrostatic capacitance type physical quantity sensor according to the one embodiment of the present invention is applied to the acceleration sensor. Incidentally, the same reference numerals as those in FIG. 1 indicate the same components respectively.

The configuration of the acceleration sensor will first be explained using FIG. 4 as one example of the detection element used in the electrostatic capacitance type physical quantity sensor according to the present embodiment.

The detection element 10 is fabricated by processing a silicon substrate using the photolithography technology. The detection element 10 is made up of a plurality of electrically-insulated electrodes. They constitute electrostatic capacitances with respect to each other and at the same time some thereof are supported so as to be displaceable mechanically.

The respective electrodes are made up of fixed first detection electrodes Ef1$a$ and Ef1$b$ and second detection electrodes Ef2$a$ and Ef2$b$, and movable electrodes Ema and Emb which are movable together with a movable mass 18 supported displaceably by acceleration and electrically conductive to the movable mass 18.

One ends of springs 17$a$ and 17$b$ are coupled to both ends of the movable mass 18. The other ends of the springs 17$a$ and 17$b$ are fixed to movable electrode side terminals Tma and Tmb. Thus, when acceleration is applied to the detection element 10 from outside, the movable mass 18 is displaced depending on the acceleration. The movable electrodes Ema and Emb are respectively conductive to the movable electrode side terminals Tma and Tmb through the movable mass 18 and the springs 17$a$ and 17$b$.

The first detection electrode Ef1$a$ is conductive to a first detection electrode side terminal Tf1$a$. The first detection electrode Ef1$b$ is conductive to a first detection electrode side terminal Tf1$b$. The second detection electrode Ef2$a$ is conductive to a second detection electrode side terminal Tf2$a$. The second detection electrode Ef2$b$ is conductive to a second detection electrode side terminal Tf2$b$.

A first variable-capacitance capacitor 11$a$ is formed between the first detection electrode Ef1$a$ and the movable electrode Ema. A first variable-capacitance capacitor 11$b$ is formed between the first detection electrode Ef1$b$ and the movable electrode Emb. A second variable-capacitance capacitor 12$a$ is formed between the second detection electrode Ef2$a$ and the movable electrode Ema. A second variable-capacitance capacitor 12$b$ is formed between the second detection electrode Ef2$b$ and the movable electrode Emb. When the first variable-capacitance capacitor 11$a$ is taken as a capacitance Cv1$a$, the first variable-capacitance capacitor 11$b$ is taken as a capacitance Cv1$b$, the second variable-capacitance capacitor 12$a$ is taken as a capacitance Cv2$a$, and the second variable-capacitance capacitor 12$b$ is taken as a capacitance Cv2$b$ in a state in which no acceleration is applied and the movable electrodes Ema and Emb are not displaced, the sum of these capacitances is assumed to be CO. In the present example, CO=2.2 pF.

Assume now that the total capacitance of the capacitance Cv1$a$ and the capacitance Cv1$b$ is Cv1, and the total capacitance of the capacitance Cv2$a$ and the capacitance Cv2$b$ is Cv2. Assuming that when predetermined acceleration is applied, the difference between the capacitance Cv1 and the capacitance Cv2 is ΔC, Cv1=½ (C0−ΔC), and Cv2=½ (C0+ΔC). In the present example, ΔC=0.1 pF, for example.

Electrically-grounded shield wires 16a and 16b are disposed around the movable electrodes Ema and Emb. The shield wire 16a is conductive to a shield terminal 16at, and the shield wire 16b is conductive to a shield terminal 16bt. The shield terminals 16at and 16bt are connected to a dc potential of low impedance so that the shield wires 16a and 16b serve as shielding. Incidentally, although a ground potential is also included in the dc potential of low impedance, the dc potential is set as a potential of low impedance having the same dc potential as the movable electrodes Ema and Emb herein. Equalizing the dc potentials of the shield wires 16a and 16b and the movable mass 18 to each other in this manner makes it possible to prevent an unnecessary electrostatic attraction force from acting on the movable mass due to the difference in potential.

Here, parasitic capacitances Cp are respectively formed between the movable electrodes Ema and Emb and the shield wires 16a and 16b. In the present example, the sum of the parasitic capacitances Cp is 8.0 pF.

The configuration of the acceleration sensor will next be explained using FIG. 5 as one example of the electrostatic capacitance type physical quantity sensor according to the present embodiment.

The acceleration sensor illustrated as one example of the electrostatic capacitance type physical quantity sensor according to the present embodiment is comprised of a detection element 10, a carrier wave application section 20 and a capacitance detection circuit section 30.

The detection element 10 is provided with variable-capacitance capacitors 11 and 12. The variable-capacitance capacitor 11 consists of a combination of the variable-capacitance capacitors 11a and 11b shown in FIG. 4. The variable-capacitance capacitor 12 consists of a combination of the variable-capacitance capacitors 12a and 12b shown in FIG. 4.

A variable electrode side wire 13 is connected to detection electrodes (detection electrodes Ef1a and Ef1b shown in FIG. 4) of the variable-capacitance capacitor 11. A movable electrode side wire 15 is connected to a movable electrode (movable electrode Ema in FIG. 4). A detection electrode side wire 14 is connected to detection electrodes (detection electrodes Ef2a and Ef2b in FIG. 4) of the variable-capacitance capacitor 12. A movable electrode side wire 15 is connected to a movable electrode (movable electrode Emb in FIG. 4). A shield wire 16 is disposed around the movable electrode side wire 15. The shield wire 16 is connected to a dc potential of low impedance. The shield wire 16 is connected to a potential of low impedance, having the same dc potential as the movable electrode Em. Here, a parasitic capacitance Cp is formed between the movable electrode side wire 15 and the shield wire 16. The parasitic capacitance Cp is 8.0 pF, for example.

The carrier wave application section 20 is provided with carrier wave signal sources 21 and 22. A carrier wave signal Vcarr outputted from the carrier wave signal source 21 is applied to the detection electrodes of the variable-capacitance capacitor 11 through the detection electrode side wirings 13 of the detection element 10. A carrier wave signal −Vcarr outputted from the carrier wave signal source 22 is applied to the detection electrodes of the variable-capacitance capacitor 12 through the detection electrode side wire 14 of the detection element 10. The carrier wave signals outputted from the carrier wave signal sources 21 and 22 are the same frequency but ac signals which are opposite to each other in voltage polarity. The carrier wave signals Vcarr and −Vcarr are respectively transmitted to the movable electrode side wire 15 through the variable-capacitance capacitors 11 and 12. When the capacitances of the variable-capacitance capacitors 11 and 12 change at this time, the carrier wave signals themselves also change.

The capacitance detection circuit section 30 amplifiers the carrier wave signal outputted from the movable electrode side wire 15. The capacitance detection circuit section 30 is comprised of an OP amplifier 31, a feedback capacitor 32, an input terminal 33 and an output terminal 37. The carrier wave signal Vcarr sent via the variable-capacitance capacitor 11 is inputted to the input terminal 33. The input terminal 33 is connected to an inversion input of the Op amplifier 31. The feedback capacitor 32 is connected between the output terminal 37 of the OP amplifier 31 and the input terminal 33 thereof. A non-inversion input of the OP amplifier 31 is connected to a reference potential 34. Incidentally, since the earth capacitance of the input terminal 33 behaves in the same manner as a capacitance between the movable electrode side wire 15 and the shield wire 16 in the detection element, it is contained in the parasitic capacitance Cp.

The operation of the acceleration sensor will next be explained. When acceleration acts on the detection element 10, the movable mass 18 is displaced in proportion to the acceleration so that the distance between the movable mass 18 and each of the first detection electrodes Ef1a and Ef1b and the detection electrode side wire 14 changes. As a result, the values of the detection electrode capacitors 11 and 12 change with a differential operation.

Assume now that the capacitance of the variable-capacitance capacitor 11 is Cv1 and the capacitance of the variable-capacitance capacitor 12 is Cv2. Assuming that the difference between the capacitance Cv1 and the capacitance Cv2 is ΔC when predetermined acceleration is applied, Cv1=½ (C0−ΔC) and Cv2=½ (C0+ΔC). In the present example, ΔC=0.1 pF, for example.

The high-frequency carrier wave signals outputted from the carrier wave application section 20 are respectively connected to the detection electrodes of the variable-capacitance capacitor 11 and the detection electrodes of the variable-capacitance capacitor 12. The two carrier wave signals have the same frequency but are ac signals opposite to each other in voltage polarity. For this reason, the effects of both signals are combined together and hence charge signals that appear on the movable electrodes of the variable-capacitance capacitors 11 and 12 are proportional to the difference ΔC between the capacitances Cv1 and Cv2 of the variable-capacitance capacitors 11 and 12. Each of the charge signals that appeared on the movable electrodes is inputted to the input terminal 33 of the capacitance detection circuit section 30, where it is converted into a voltage signal.

A feedback amplifier circuit using the OP amplifier is configured in the capacitance detection circuit section 30. With the configuration of a negative feedback circuit by the feedback capacitor 32, the OP amplifier 31 outputs a signal to the output terminal 37 in such a manner that the voltage of the input terminal 33 becomes equal to that of the reference potential 34. In the present example, the value of the feedback capacitor 32 is Cf=2.0 pF.

As a result, the charge signal inputted to the input terminal 33 is converted as the voltage signal at the output terminal 37. When the voltage amplitude of the carrier wave signal is Vcarr, the amplitude VoutS of the signal voltage that appears at the output terminal 37 can be expressed in VoutS=Vcarr·ΔC/Cf due to the amount of change ΔC of each detection electrode capacitor.

The signal voltage amplitude VoutS is proportional to the difference ΔC in capacitance between the detection electrode capacitors 11 and 12. This is proportional to the displacement of the movable mass due to acceleration. For this reason, the acceleration can be detected by measuring the signal voltage amplitude VoutS. In the present example, the voltage amplitude of the carrier wave signal is Vcarr=0.4Vpp.

Although the above shows the operation related to the conversion of the signal component by the acceleration, a problem arises in that when the earth capacitance that depends on the portion at which the detection element 10 is connected with the capacitance detection circuit section 30 (the movable electrode side wire 15 and the input terminal 33) is large and a noise component contained in the reference potential 34 is large, internal noise derived from these becomes large.

Further, the value C0 of the input capacitance increases even by increasing the scale of each detection electrode, so that Cin also increases. When the scale of each detection electrode is made excessively large while holding a fine structure of the detection element, manufacturing fluctuations in structure become inneggligible and noise suddenly increases.

Considering the relationship between the sum of the noise derived from the inside, the noise due to the fluctuations in structure and the externally-incoming noise, and the value of the input capacitance Cin, the optimum range of the input capacitance value Cin becomes 1.5 pF<Cin<20 pF as described in FIG. 2.

The sizes of the detection electrode and the movable electrode and the interval therebetween are set in such a manner that when the stray capacitance Cp is 8.0 pF, for example, the capacitance Co of the variable-capacitance capacitor 11 reaches 2.2 pF. Consequently, the input capacitance Cin can be set to 10.2 pF and brought within the above optimum range.

As described in FIG. 3, the relationship between the value Cf of the feedback capacitor 32 in the capacitance detection circuit section and the input capacitance Cin falls within the range of 0.1<(Cf/Cin)<1.0, whereby a more satisfactory characteristic can be obtained.

A description will next be made of another configuration of a detection element where the electrostatic capacitance type physical quantity sensor according to the one embodiment of the present invention is applied to an acceleration sensor, using FIG. 6.

Figure 6:
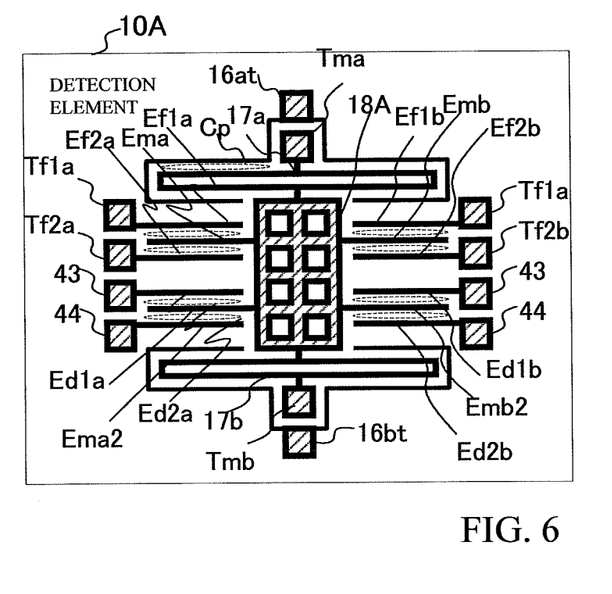
FIG. 6 is a plan view illustrating another configuration of a detection element where the electrostatic capacitance type physical quantity sensor according to the one embodiment of the present invention is applied to an acceleration sensor.

FIG. 6 is a plan view illustrating another configuration of the detection element where the electrostatic capacitance type physical quantity sensor according to the one embodiment of the present invention is applied to the acceleration sensor. Incidentally, the same reference numerals as those in FIGS. 1 and 4 indicate the same components respectively.

The detection element 10A of the present example is provided with first diagnostic electrodes Ed1a and Ed1b and second detection electrodes Ed2a and Ed2b for applying voltages to apply an electrostatic force to a movable mass actively and thereby diagnosing failures such as fixation of the movable mass, etc., and second movable electrodes Ema2 and Emb2 in addition to first detection electrodes Ef1a and Ef1b and second detection electrodes Ef2a and Ef2b.

In this case, diagnostic electrode capacitances are respectively formed between the first diagnostic electrode Ed1a and the second movable electrode Ema2, between the first diagnostic electrode Ed1b and the second movable electrode Ema2, between the second diagnostic electrode Ed2a and the second movable electrode Ema2 and between the second diagnostic electrode Ed2b and the second movable electrode Ema2. However, the diagnostic electrodes are substantially intended for signals of low impedance. These capacitances are contained in a parasitic capacitance 17.

A description will next be made of a configuration and an operation where the electrostatic capacitance type physical quantity sensor according to the one embodiment of the present invention is applied to an angular velocity sensor, using FIG. 7.

Figure 7:
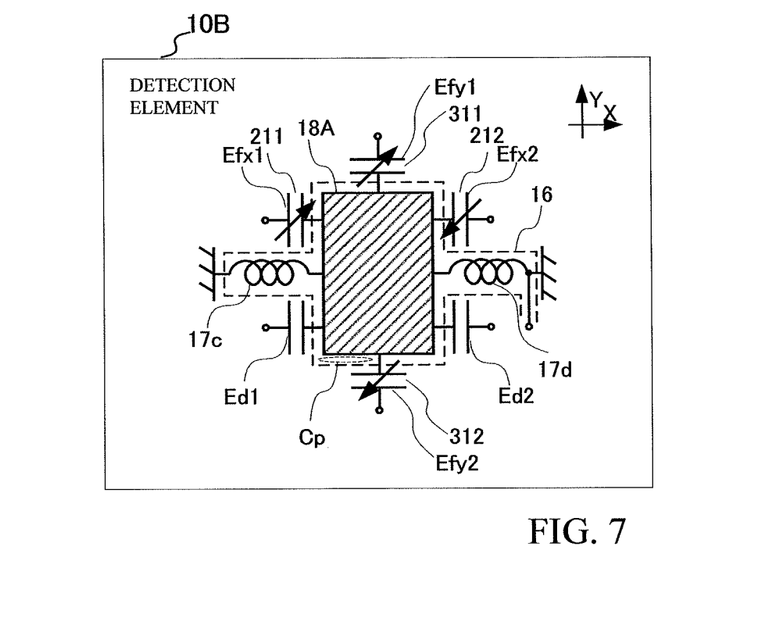
FIG. 7 is a plan view showing a configuration of a detection element where the electrostatic capacitance type physical quantity sensor according to the one embodiment of the present invention is applied to an angular velocity sensor.

FIG. 7 is a plan view illustrating a configuration of a detection element where the electrostatic capacitance type physical quantity sensor according to the one embodiment of the present invention is applied to the angular velocity sensor. Incidentally, the same reference numerals as those in FIG. 1 indicate the same components respectively.

The detection element 10B is made up of a plurality of electrically-insulated electrodes. They constitute electrostatic capacitances with respect to each other and at the same time some thereof are supported by springs 17c and 17d so that a movable mass 18A is displaceable mechanically in two directions that intersect at right angles. Detection electrodes Efx1 and Efx2 for detecting a displacement of the movable mass 18A in an X direction being a first direction are configured. First variable-capacitance capacitors 211 and 212 are respectively formed between the detection electrodes and movable electrodes conductive to the movable mass 18A. Likewise, detection electrodes Efy1 and Efy2 for detecting a displacement of the movable mass 18A in a Y direction being a second direction orthogonal to the X direction are configured. Second variable-capacitance capacitors 311 and 312 are respectively formed between the detection electrodes and movable electrodes conductive to the movable mass 18A.

Drive electrodes Ed1 and Ed2 for exciting the movable mass 18A in the X direction by an electrostatic attraction force are configured. Further, an electrically-grounded shield wire 16 is disposed around the movable electrodes conductive to the movable mass 18A. Here, a parasitic capacitance Cp is formed between the movable electrode E and the shield wire 16.

In such a detection element, upon detection of acceleration, the movable mass 18A is first displaced in the X direction when the acceleration is applied to the detection element 10 in the X direction. With this displacement, the distance between the movable electrode conductive to the movable mass 18A and each of the detection electrodes Efx1 and Efx2 changes, and the values of the first variable-capacitance capacitors 211 and 212 change. Therefore, such changes in capacitance are detected by such carrier wave application section 20 and capacitance detection circuit section 30 as shown in FIG. 1, and their dc components are detected, thereby making it possible to detect the acceleration in the X direction.

When acceleration is applied to the detection element 10 in a Y direction, the movable mass 18A is displaced in the Y direction. With this displacement, the distance between the movable electrode conductive to the movable mass 18A and each of the detection electrodes Efy1 and Efy2 changes, and the values of the second variable-capacitance capacitors 311 and 312 change. Therefore, dc components thereof are detected in like manner, thereby making it possible to detect the acceleration in the Y direction.

Next, when ac voltages opposite to each other in phase are applied to the drive electrodes Ed1 and Ed2 upon detection of an angular velocity, ac electrostatic attraction forces occur in the movable mass 18A so that the movable mass 18A vibrates in the X direction. When an angular velocity in a direction orthogonal to both X and Y directions is applied to the detection element 10B in this state, a force in the Y direction acts on the movable mass 18A by the Coriolis effect, so that the movable mass 18A vibrates even in the Y direction. With the vibrational displacement, the distance between the movable electrode conductive to the movable mass 18A and each of the detection electrodes Efy1 and Efy2 changes, and the values of the second variable-capacitance capacitors 311 and 312 change. Therefore, of such changes in capacitance, the amplitude synchronized with the frequency of the vibration is detected, thereby making it possible to detect an angular velocity.

Figure 8:
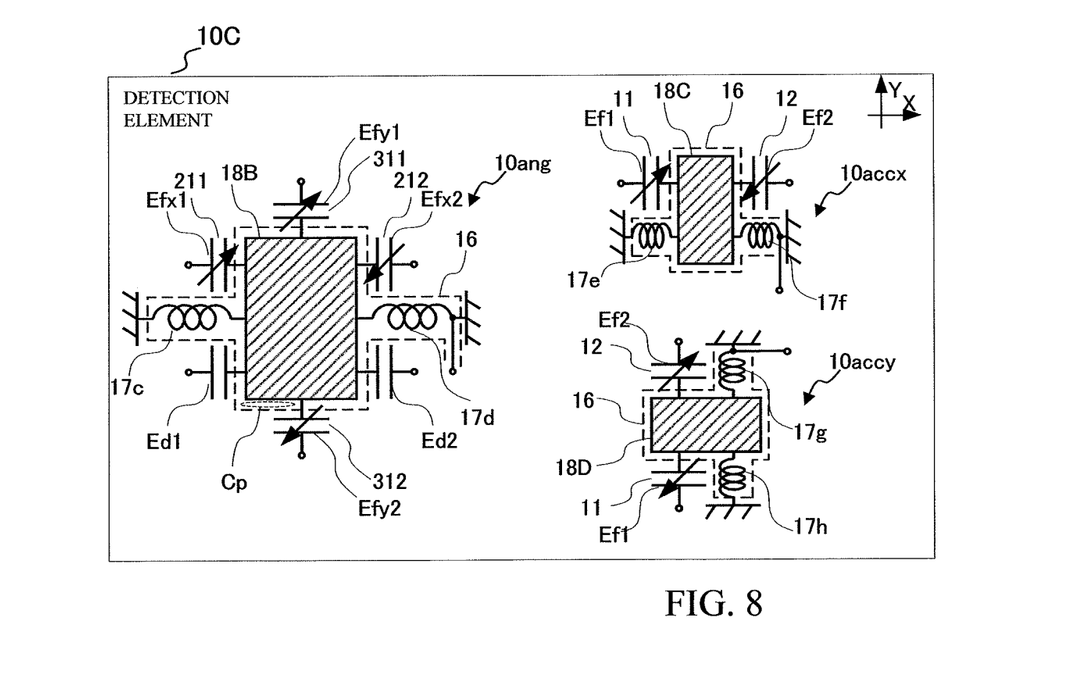
FIG. 8 is a plan view illustrating another configuration of a detection element where the electrostatic capacitance type physical quantity sensor according to the one embodiment of the present invention is applied to an angular velocity sensor.

A description will next be made of another configuration where the electrostatic capacitance type physical quantity sensor according to the one embodiment of the present invention is applied to an angular velocity sensor.

FIG. 8 is a plan view illustrating another configuration of a detection element where the electrostatic capacitance type physical quantity sensor according to the one embodiment of the present invention is applied to the angular velocity sensor. Incidentally, the same reference numerals as those in FIGS. 1 and 7 indicate the same components respectively.

FIG. 8 illustrates, as a detection element 10C, a sensor in which circuit sections are integrated using discrete detection elements as for a sensor 10*accx* for detection of acceleration in an X direction, a sensor 10*accy* for detection of acceleration in a Y direction and a sensor 10*ang* for detection of an angular velocity.

A description will next be made of a configuration and an operation where the electrostatic capacitance type physical quantity sensor according to the one embodiment of the present invention is applied to a pressure sensor, using FIG. 9.

Figure 9:
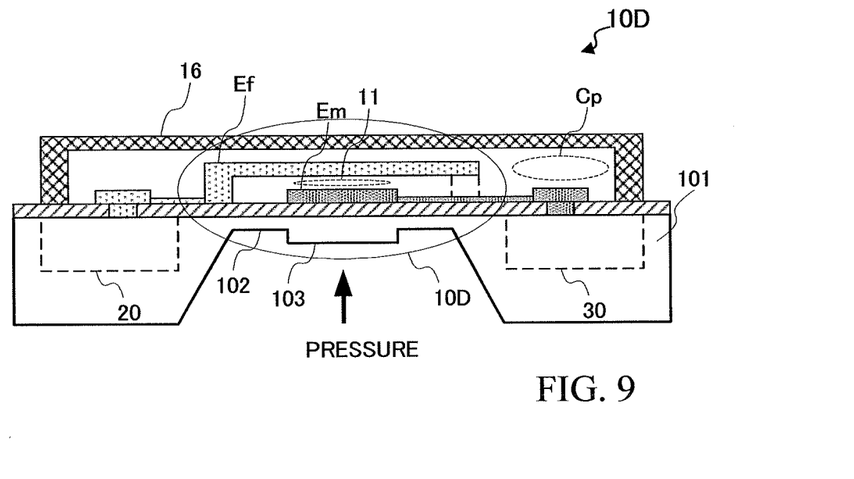
FIG. 9 is a plan view depicting a configuration of a detection element where the electrostatic capacitance type physical quantity sensor according to the one embodiment of the present invention is applied to a pressure sensor.

FIG. 9 is a plan view illustrating a configuration of a detection element where the electrostatic capacitance type physical quantity sensor according to the one embodiment of the present invention is applied to the pressure sensor. Incidentally, the same reference numerals as those in FIG. 1 indicate the same components respectively.

The pressure sensor detects pressure from a change in electrostatic capacitance with pressure-based deformation. The pressure sensor corresponding to the detection element 10D is fabricated by processing a silicon substrate.

The detection element 10D is fabricated by processing a silicon substrate 101 together with a carrier wave application section circuit corresponding to a carrier wave application section 20, and a CV conversion section circuit corresponding to a capacitance detection circuit section 30. The detection element 10D is formed with a thin-film processed support portion 102 and a diaphragm 103. A fixed detection electrode Ef and a movable electrode Em displaced with the diaphragm are formed on the upper surface of the silicon substrate 101, and a grounded shield 16 is formed around these. A variable-capacitance capacitor 11 is formed between the detection electrode Ef and the movable electrode Em. A parasitic capacitance Cp is formed between the movable electrode Em and the shield 16. The detection electrode Ef is connected to the carrier wave application section 20, and the movable electrode Em is connected to the capacitance detection circuit section 30, respectively.

The carrier wave application section 20 and the capacitance detection circuit section 30 take such a circuit configuration as shown in FIG. 1. The carrier wave application section 20 and the capacitance detection circuit section 30 perform operations similar to the carrier wave application section 20 and the capacitance detection circuit section 30 described in FIG. 1.

When pressure is applied to the diaphragm 103, the support portion 102 is flexed together with the movable electrode Em so that the distance between the movable electrode Em and the detection electrode Ef changes and the value of the capacitance of the variable-capacitance capacitor 11 changes. The change in capacitance is converted into a voltage signal by the carrier wave application section 20 and the capacitance detection circuit section 30 equivalent to those described in FIG. 1, whereby pressure can be detected.

Although a problem arises in that when the earth capacitance that exists in the portion at which the detection element 10 is connected with the capacitance detection circuit section 30 is large and a noise component contained in the reference potential is large, internal noise derived from these becomes large, the pressure sensor according to the present embodiment can also obtain a satisfactory characteristic by application of the contents of the present invention thereto.

According to the present embodiment as described above, the reduction in the effect by the externally-incoming noise and the reduction in the effect of noise derived from the internal noise can be made compatible, and high-accuracy detection of the physical quantity is hence enabled.

DESCRIPTION OF REFERENCE NUMERALS 10, 10A, 10B, 10C, 10D . . . detection elements
11, 12 . . . variable-capacitance capacitors
16 . . . shield wire
18, 18A, 18V, 18C . . . movable bodies
20 . . . carrier wave application section
21, 22 . . . carrier wave signal sources
30 . . . capacitance detection circuit section
31 . . . OP amplifier
32 . . . feedback capacitor
33 . . . input terminal
34 . . . reference potential
35 . . . circuit internal noise
37 . . . output terminal
Cp . . . parasitic capacitance
Ef . . . detection electrode
Em . . . movable electrode

The invention claimed is:

1. An electrostatic capacitance type physical quantity sensor comprising:
    a detection element having a movable mass supported displaceably by a physical quantity given from the outside, and a detection electrode formed in at least one side of the movable mass;
    a capacitance detection circuit which detects a change in the capacitance of the detection electrode due to the displacement of the movable mass; and
    shield wirings which are disposed around wirings connected to an input of the capacitance detection circuit, the former wire being connected to a dc potential of low impedance, wherein
        the capacitance detection circuit converts the change in the capacitance of the detection electrode due to the displacement of the movable mass into an electric signal to thereby detect a physical quantity, and
        a value Cin of an input capacitance relative to a fixed potential of low impedance at a portion at which the detection element is connected with the capacitance detection circuit falls within a range of 1.5 pF<Cin<20 pF.

2. An electrostatic capacitance type physical quantity sensor according to claim 1, wherein a relationship between a value Cf of a feedback capacitor in the capacitance detection circuit and the input Cin falls within a range of 0.1<(Cf/Cin)<1.0.

3. An electrostatic capacitance type physical quantity sensor according to claim 1, wherein the shield wire has the same potential as a dc potential of a carrier wave signal used in capacitance detection.

4. An electrostatic capacitance type physical quantity sensor according to claim 1, wherein the detection element is provided with diagnostic electrodes each of which applies an electrostatic attraction force to the movable mass.

5. An electrostatic capacitance type physical quantity sensor according to claim 1, wherein the movable mass comprises silicon crystal.

6. An angular velocity sensor comprising:
a detection element including:
- a movable mass supported displaceably by an angular velocity given from the outside,
- two detection electrodes formed in two surfaces orthogonal to each other, of the movable mass, and
- drive electrodes which vibrate the movable mass;

a capacitance detection circuit which detects changes in capacitances of the two detection electrodes by a Coriolis effect derived from an angular velocity applied to the movable mass in a state of vibration, the state of vibration being caused by the drive electrodes; and shield wirings which are disposed around wirings connected to an input of the capacitance detection circuit, the former wire being connected to a dc potential of low impedance, wherein the capacitance detection circuit converts the change in the capacitance of each of the detection electrodes due to the displacement of the movable mass into an electric signal to thereby detect an angular velocity, and a value Cin of an input capacitance relative to a fixed potential of low impedance at a portion at which the detection element is connected with the capacitance detection circuit falls within a range of 1.5 pF<Cin<20 pF.

* * * * *